US010241577B2

(12) United States Patent
Rihn et al.

(10) Patent No.: US 10,241,577 B2
(45) Date of Patent: Mar. 26, 2019

(54) SINGLE ACTUATOR HAPTIC EFFECTS

(71) Applicant: Immersion Corporation, San Jose, CA (US)

(72) Inventors: William S. Rihn, San Jose, CA (US); Mohammadreza Motamedi, Montreal (CA); Danny A. Grant, Laval (CA); Neil T. Olien, Montreal (CA); Vincent Levesque, Montreal (CA); Jamal Saboune, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/665,891

(22) Filed: Aug. 1, 2017

(65) Prior Publication Data

US 2019/0041986 A1   Feb. 7, 2019

(51) Int. Cl.
*G06F 3/01* (2006.01)
*A63F 13/285* (2014.01)

(52) U.S. Cl.
CPC ............ *G06F 3/016* (2013.01); *A63F 13/285* (2014.09)

(58) Field of Classification Search
None
See application file for complete search history.

(56) References Cited

U.S. PATENT DOCUMENTS

| 9,174,134 | B1 | 11/2015 | Grant et al. |
| 2002/0080116 | A1 | 6/2002 | Onodera et al. |
| 2012/0092263 | A1* | 4/2012 | Peterson ................. G06F 3/016 345/168 |
| 2015/0070145 | A1 | 3/2015 | Mar et al. |
| 2015/0331488 | A1 | 11/2015 | Grant et al. |
| 2016/0132116 | A1* | 5/2016 | Grant ..................... G06F 3/016 345/156 |

* cited by examiner

*Primary Examiner* — Duane N Taylor, Jr.
(74) *Attorney, Agent, or Firm* — Miles & Stockbridge P.C.

(57) ABSTRACT

A haptic enabled device that is configured to render one or more haptic effects is provided. The haptic enabled device includes an actuator and a plurality of user input elements. Each of the plurality of user input elements is configured to be selectively coupled to the actuator. In addition, the actuator is configured to be positioned to render the one or more haptic effects at each of the plurality of user input elements.

20 Claims, 7 Drawing Sheets

Example Stage 1

Example Stage 2

400

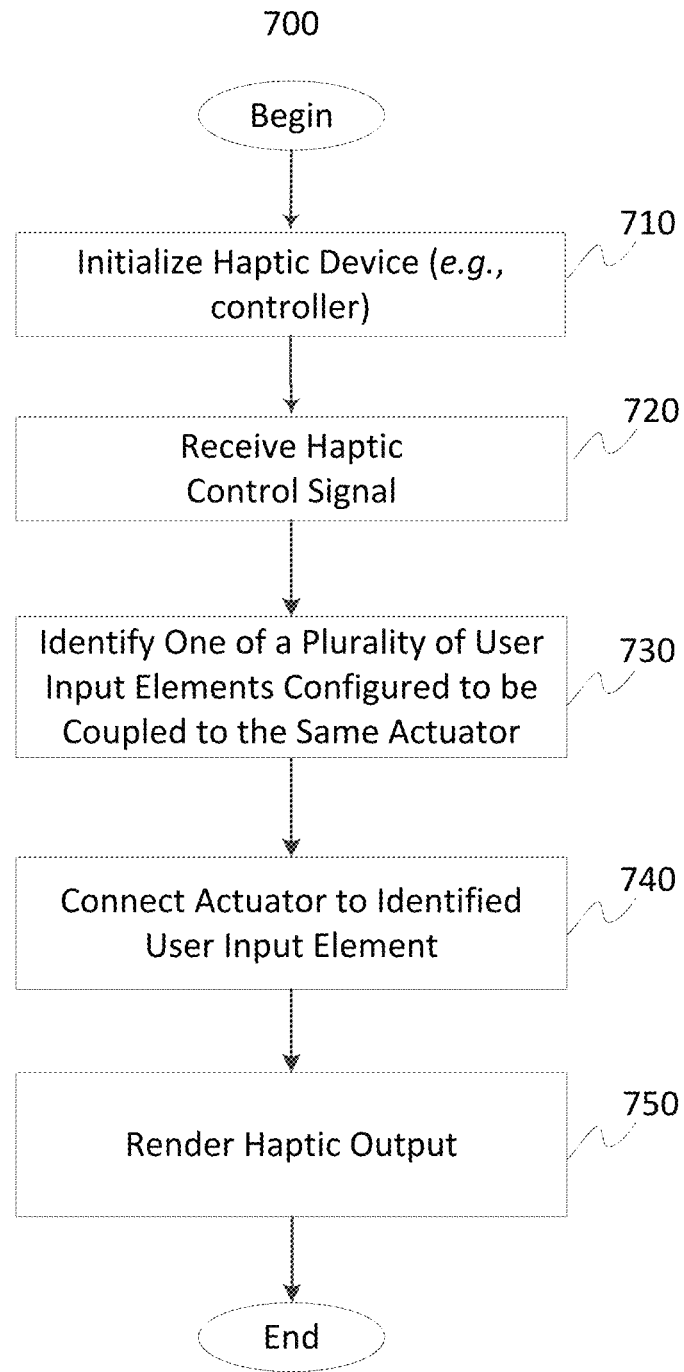

US 10,241,577 B2

SINGLE ACTUATOR HAPTIC EFFECTS

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, smartphones, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, a haptically enabled device that is configured to render one or more haptic effects is provided. The haptically enabled device includes an actuator and a plurality of user input elements. Each of the plurality of user input elements is configured to be selectively coupled to the actuator. In addition, the actuator is configured to be positioned to render the one or more haptic effects at each of the plurality of user input elements.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates a flow diagram of a functionality for rendering haptic effects according to an example embodiment of the present invention.

DETAILED DESCRIPTION

The embodiments of the present invention generally relate to systems and methods that provide haptic effects at different locations, such as different user input elements and/or surfaces, of the same device/system using a single actuator. In the various embodiments, the haptic effects can be independently and/or simultaneously rendered at different locations of the device. The different locations may be adjacent to one another or disposed on different surfaces of the same device.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, a variety of user interfaces and methods for using a device are described. In some embodiments, the device is a portable electronic device (e.g., a game controller, wand, console, mobile phone, smartphone, tablet, etc.). It should be understood, however, that the user interfaces and associated methods may be applied to numerous other devices, such as personal computers, smartphones, medical devices, laptops, and the like that may include one or more other physical user-interface devices, such as a keyboard, mouse, trackball, joystick, motion and orientation sensing devices, and the like.

Figure 1:
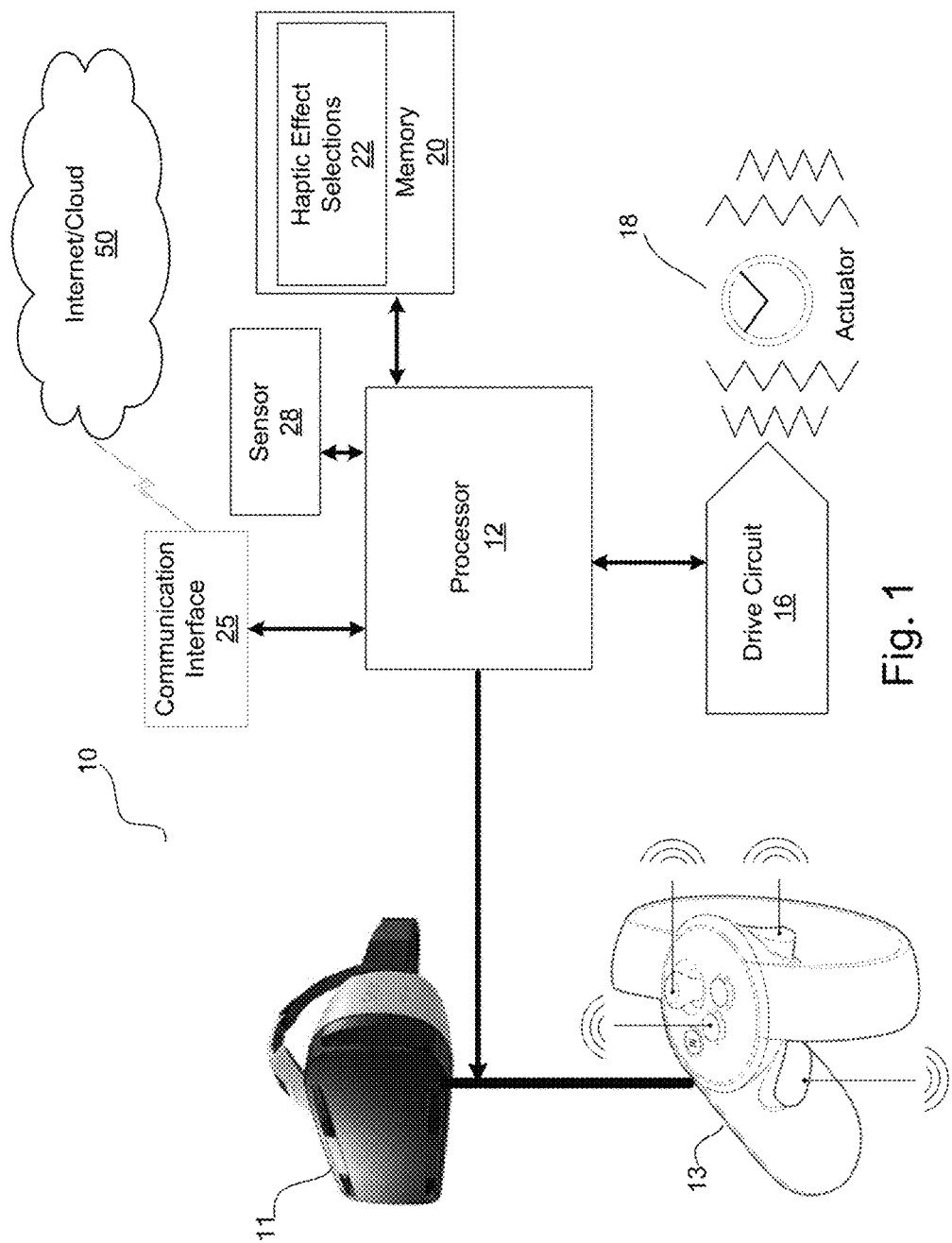
FIG. 1 illustrates a haptically-enabled virtual reality ("VR") system according to an example embodiment of the invention.

FIG. 1 illustrates a haptically-enabled virtual reality ("VR") system 10 according to an example embodiment of the invention. Example system 10 includes a headset 11 and a handheld controller 13. Headset 11 provides audio and visual immersion for VR system 10. Handheld controller 13 provides haptic effects at a variety of user input elements (e.g., triggers, buttons, sticks, etc.) and/or device surfaces in conjunction with the VR immersion experience provided by headset 11. In one embodiment, system 10 includes two handheld controllers, one for each hand of the user. Although shown in FIG. 1 as a handheld device, handheld controller 13 in other embodiments can be configured to contact other areas of a user's body, and may include other discrete elements for contacting other areas of the user's body. System 10 can also include a gamepad, motion wand, etc. All body contacting elements, including headset 11 and handheld controller 13, are communicatively coupled via a wireless or wired connection.

Internal to system 10 is a haptic feedback system that generates haptic effects on system 10. In one embodiment, the haptic effects are generated using controller 13. The haptic feedback system includes a processor 12. Coupled to processor 12 are a memory 20 and a drive circuit 16, which is coupled to an actuator 18.

Processor 12 may comprise one or more general or specific purpose processors configured to perform computation and control functions of system 10. Processor 12 may include an application-specific integrated circuit ("ASIC"), a single integrated circuit, such as a microprocessing device, or may include multiple integrated circuit devices and/or circuit boards working in cooperation to accomplish the functions of processor 12. In addition, processor 12 may execute computer programs, such as an operating system, actuator module, and other applications, stored within memory 20.

Processor 12 can determine what haptic effects are rendered and the order in which the effects are rendered based on high level parameters. In general, the high level parameters that define a particular haptic effect include magnitude, frequency, and duration. Low level parameters, such as streaming motor commands, can also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16, which includes electronic components and circuitry used to supply actuator 18 with the required electrical current and voltage (i.e., "motor signals") to cause the desired haptic effects to be generated. System 10 may include multiple actuators 18, and each actuator 18 may be coupled to multiple user input elements (e.g., buttons, triggers, and other surfaces). In addition, each actuator 18 may include a separate drive circuit 16, all coupled to a common processor 12. In addition, each actuator 18 may be configured to provide haptic effects to two or more user input elements (e.g., triggers, buttons, sticks, etc.) or other surfaces of handheld controller 13.

Memory device 20 can be any type of transitory or non-transitory storage device or computer-readable medium, such as random access memory ("RAM"), dynamic RAM (DRAM), static RAM (SRAM), read only memory ("ROM"), flash memory, cache memory, and/or any other type of computer-readable medium. Communication media may include computer readable instructions, data structures, program modules, or other data in a modulated data signal such as a carrier wave or other transport mechanism, and includes any information delivery media. Memory 20 may be located internal to processor 12, or any combination of internal and external memory.

Memory 20 stores instructions that are executed by processor 12, such as operating system instructions or haptic instructions. Among the instructions, memory 20 includes a haptic effect selections module 22 which includes instructions that, when executed by processor 12, select one of a plurality of user input elements or device surfaces for rendering haptic effects using a single actuator, as discussed in more detail below. By using a single actuator to render haptic effects at multiple user input elements, the cost and weight of handheld device 13 is reduced. In addition, significant the power saving is also achieved.

Actuator 18 may be any type of device that generates haptic effects, and can be physically located in any area of system 10, typically located within handheld controller 13, to be able to generate the desired haptic effect to the desired area of a user's body. In one embodiment, actuator 18 is a haptic output device that generates vibrotactile haptic effects. Actuators used for this purpose may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output devices may also include a device such as an electrostatic friction ("ESF") device or an ultrasonic surface friction ("USF") device, or a device that induces acoustic radiation pressure with an ultrasonic haptic transducer. Other devices can use a haptic substrate and a flexible or deformable surface, and devices can provide projected haptic output such as a puff of air using an air jet, etc. Haptic output devices can further include a device that provides thermal haptic effects (e.g., heats up or cools off).

System 10 further includes a sensor 28 coupled to processor 12. Sensor 28 can be used to detect any type of properties of the user of system 10 (e.g., a biomarker such as body temperature, heart rate, etc.), or of the context of the user or the current context (e.g., the location of the user, the temperature of the surroundings, etc.).

Sensor 28 can be configured to detect a form of energy, or other physical property, such as, but not limited to, sound, movement, acceleration, physiological signals, distance, flow, force/pressure/strain/bend, humidity, linear position, orientation/inclination, radio frequency, rotary position, rotary velocity, manipulation of a switch, temperature, vibration, or visible light intensity. Sensor 28 can further be configured to convert the detected energy, or other physical property, into an electrical signal, or any signal that represents virtual sensor information. Sensor 28 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), a microphone, a photometer, an altimeter, a biological monitor, a camera, or a light-dependent resistor.

System 10 further includes a communication interface 25 that allows system 10 to communicate over the Internet/cloud 50. Internet/cloud 50 can provide remote storage and processing for system 10 and allow system 10 to communicate with similar or different types of devices. Further, any of the processing functionality described herein can be performed by a processor/controller remote from system 10 and communicated via interface 25. The various components of system 10, except actuator 18, may be located remote from controller 13, such as in a central console or in an Internet based cloud device.

Figure 2:
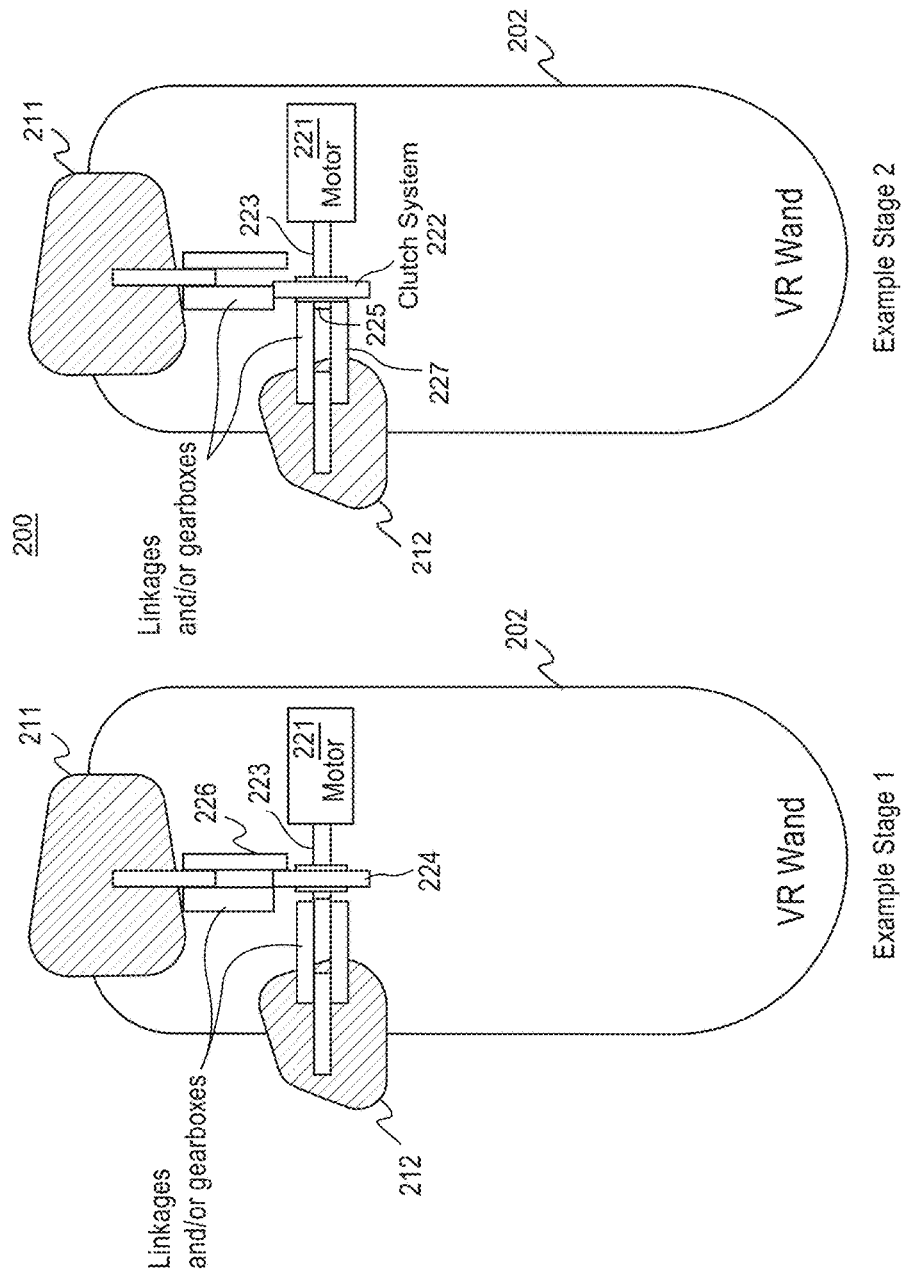
FIG. 2 illustrates a haptically-enabled controller according to an example embodiment of the present invention.

FIG. 2 illustrates a haptically-enabled controller 200 according to an example embodiment of the present invention. As shown in FIG. 2, which depicts the capability of rendering of haptic effects at different components of controller 200 (such as controller 13 of FIG. 1) in first and second stages, controller 200 may include a variety of components such as a housing 202, first user input element 211 and second user element 212 (e.g., buttons, triggers, sticks, etc.), switchable actuator 221, and clutch system 222 (not labeled in stage 1). In a first stage, clutch system 222 engages switchable actuator 221 with gearbox 226 to provide haptic feedback at user input element 211. In a second stage, clutch system 222 engages switchable motor/actuator 221 with gearbox 227 to provide haptic feedback at user input element 212.

In an example configuration of the first stage, switchable actuator 221 laterally (e.g., inwardly) positions rotating shaft 223 to couple drive gear 224 with gearbox 226 of user input element 211. Shaft 223 is coupled to switchable actuator 221 at one end and either of first gearbox 226 or second gearbox 227 of respective first user input element 211 or second user element 212 at the other end. An alignment of drive gear 224 with gearbox 226 allows actuator 221 to render one or more haptic effects (e.g., pushing/pulling, vibrating, etc.) at user input element 211. Similarly, in an example configuration of the second stage, switchable actuator 221 laterally (e.g., outwardly) moves shaft 223 to couple drive gear 225 with gearbox 227 of user input element 212. As shown in FIG. 2, an alignment of first drive gear 224 or second drive gear 225 with respective first gear box 226 or second gearbox 227 allows a single actuator 221 to render one or more haptic effects (e.g., pushing/pulling, vibrating, etc.) at first user input element 211 and second user element 212. In another configuration, shaft 223 may be laterally moved back and forth to render alternating haptic effects at first user input element 211 and second user element 212.

In some configurations, shaft 223 may be configured to move relative to an output location, such as first user input element 211 or second user input element 212. For example, since second user element 212 may be pressed in by the user to activate, a haptic effect may cause first drive gear 224 to remain at rest so that second gearbox 227 engages clutch system 222. Here, the lack of a haptic effect call may cause first drive gear 224 to recede toward switchable actuator 221 to prevent contact with clutch system 222 if no haptic effect call is made. In addition, gearbox drag is avoided since, at rest, switchable actuator 221 makes contact with no endpoints and can move to avoid contact with clutch system 222.

The various components of controller 200 may be alternatively configured to independently provide haptic feedback to one of first user input element 211 and second user element 212 using a single switchable actuator 221. For example, in controller 200, switchable actuator 221 is coupled to one of first user input element 211 and second user element 212 using any of a variety of drive mechanisms, such as gearboxes, linkages, magnetic couplings, electromagnetic couplings, and the like. For example, electromagnetic clutches operate electrically, but transmit torque mechanically. In another example, the linkages may be magnetic, and accordingly, may not require a physical coupling. In the various configurations, a combination of linkages, levers, drive arms, gearboxes, magnets, electromagnets, locking mechanisms, and the like may be used.

In contrast with conventional systems, in which a respective haptic output device is generally needed for each user input element, embodiments of the present invention provide that the haptic feedback may be rendered at multiple user input elements using a single actuator. Alternatively, or additionally, controller 200 may be configured to simultaneously render haptic feedback to a subset of a plurality of triggers, such as user input element 211 and another user input element (not shown) that is disposed opposite of user input element 211, using a single switchable actuator 221.

In some embodiments, a haptic control signal may be varied to select one of first user input element 211 and second user element 212 for rendering the haptic effect. By applying different haptic control signals to clutch system 222 and/or actuator 221, different user input elements may be targeted. Here, each of first user input element 211 and second user element 212 or surfaces of controller 200 may be configured to render haptic effects in response to predetermined haptic control signals (e.g., based on amplitude, waveform, frequency, etc.).

Figure 3:
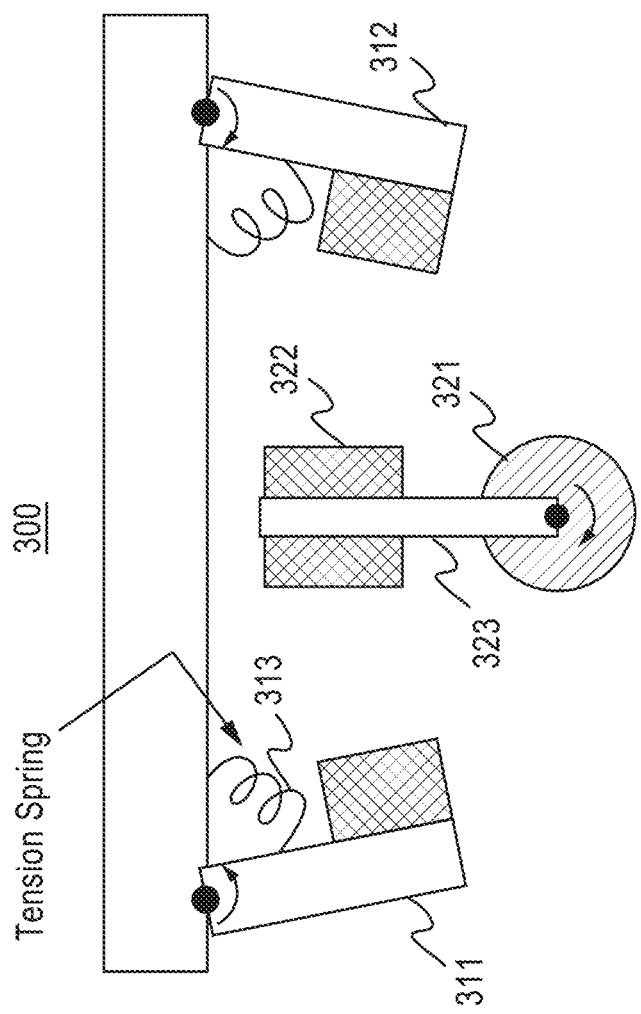
FIG. 3 illustrates a structure for rendering haptic effects at multiple user input elements using a single actuator according to an example embodiment of the present invention.

FIG. 3 illustrates a structure 300 for rendering haptic effects at multiple user input elements using a single actuator according to an example embodiment of the present invention.

As shown in FIG. 3, structure 300 may include a variety of components such as first user input element 311 and second user element 312 (e.g., triggers, buttons, sticks, and other user input elements or surfaces, etc.), tension springs 313, and rotatable actuator 321. In a first configuration, a rotatable actuator 321 couples with user input element 311 to provide haptic feedback (e.g., vibration, push/pull, etc.). In a second configuration, rotatable actuator 321 couples with user input element 312 to provide haptic feedback. Although rotatable actuator 321 is depicted as moving in a clockwise or counter clockwise direction, other configurations are also feasible. For example, actuator 321 may be configured to traverse lateral directions along one or more rails (not shown). In either configuration, tensions springs 313 are configured to maintain a default position of first user input element 311 and second user element 312.

When a drive arm 323 of rotatable actuator 321 is disposed in a central position between first user input element 311 and second user element 312, actuator mass 322 is also disposed in a central position and is free to move back and forth to render vibration and/or other haptic effects. When drive arm 323 turns counter clockwise, drive arm 323 engages user input element 311 and one or more forces may be rendered at user input element 311. When drive arm 323 turns clockwise, drive arm 323 engages user input element 312 and one or more forces may be rendered at user input element 312. In some instances, in order to render push and/or pull haptic effects at first user input element 311 and second user element 312, drive arm 323 may utilize magnets, electromagnets, pin locks, and the like to couple actuator mass 322 with first user input element 311 and second user element 312. In addition, magnetic couplings may be used to vary the load of actuator mass 322 to provide a tunable actuator.

Accordingly, the various components of structure 300 are configured to independently provide haptic feedback to one of a plurality of user input elements, such as one of first user input element 311 and second user element 312, using a single rotatable actuator 321. For example, in structure 300, rotatable actuator 321 may be coupled to one of first user input element 311 and second user element 312 using any of a variety of drive mechanisms, such as gearboxes, linkages, magnetic couplings, electromagnetic couplings, and the like.

In a gaming example, a user may utilize a controller (e.g., a gun) with a first trigger, such as user input element 311, and experience a haptic effect when pressing the first trigger as drive arm 323 has engaged the first trigger. The user then taps the controller on a surface (e.g., a table) and experiences another haptic effect, such as vibration forces, from the rotatable actuator 321 oscillating back and forth around the center position. The user then presses a second trigger, such as user input element 312, on the controller and experiences one or more haptic effects on the second trigger as drive arm 323 has engaged the second trigger.

Figure 4:
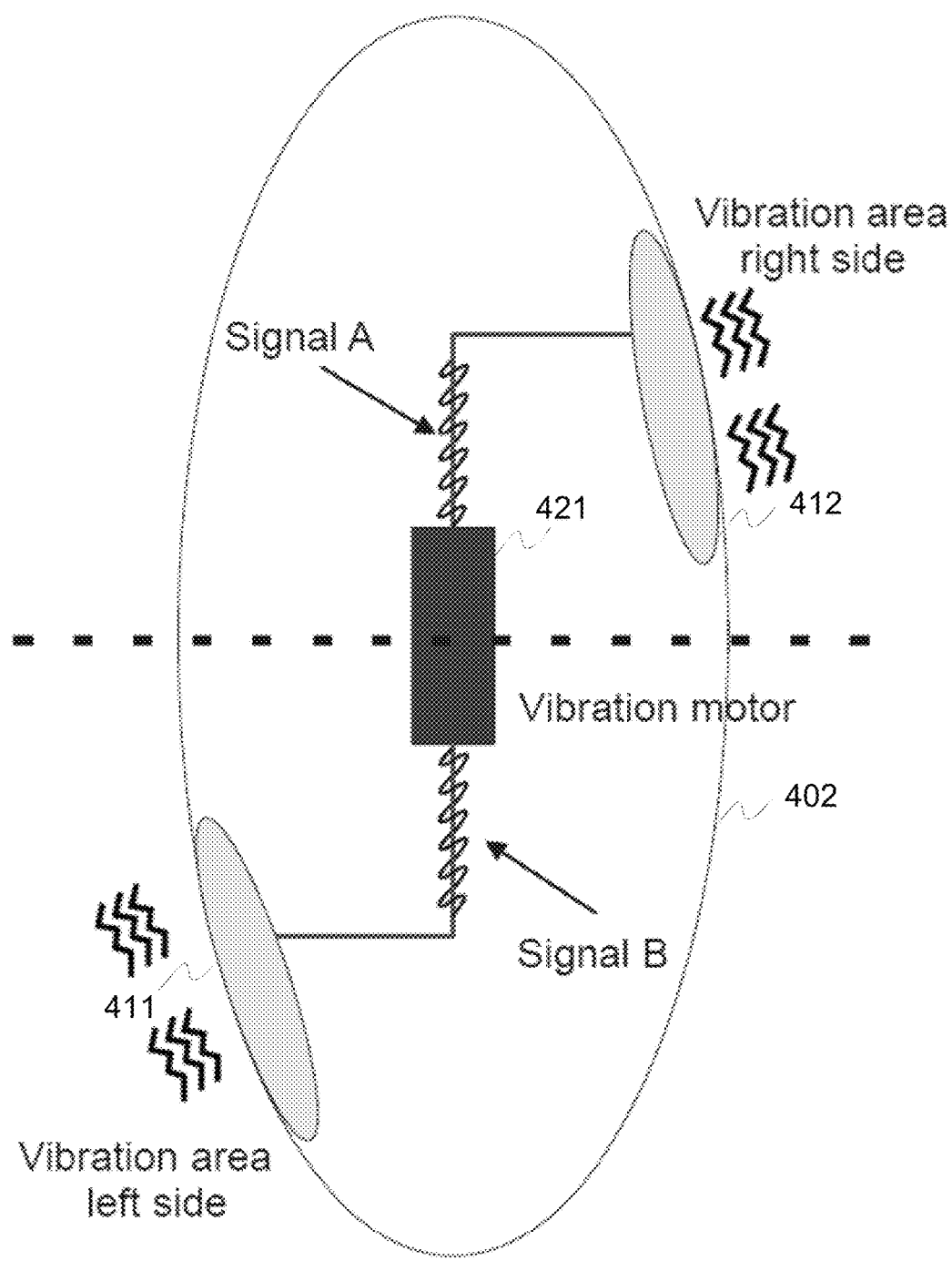
FIG. 4 illustrates a haptically-enabled controller according to another example embodiment of the present invention.

FIG. 4 illustrates a haptically-enabled controller 400 according to another example embodiment of the present invention. As shown in FIG. 4, controller 400 may include a variety of components such as a housing 402, first user input element 411 and second user element 412, and motor/actuator 421. Actuator 421 is configured to independently and/or simultaneously render haptic effects at first user input element 411 and second user element 412. In some configurations, output by motor/actuator 421 may be selectively applied to one of first user input element 411 and second user element 412 using a bidirectional actuator. For example, the bidirectional actuator used for motor/actuator 421 may be driven with to produce a haptic effect only in one direction. In this example, with a configurable mechanical assembly, motor/actuator 421 does not make contact with the components in the opposite direction in which it is firing. In other configurations, motor/actuator 421 is disposed on one or more rails and moved by another lower power motor/actuator such that it is in contact with either first user input element 411 or second user input element 412. Alternatively, a mechanical structure may be configured such that when first user input element 411 or second user input element 412 is pressed, it comes in contact with motor/actuator 421. Here, if both user input elements are pressed, then both first user input element 411 and second user input element 412 render haptic effects.

In this embodiment, actuator 421 is configured to engage either of first user input element 411 and second user element 412 depending on a haptic control signal (e.g., supplied by the processor, such as processor 12 of FIG. 1). For example, actuator 421 may engage with either of first user input element 411 and second user element 412 according to an input voltage. In another example, user input element 411 may render haptic effects in response to a 3V square signal while user input element 412 may render haptic effects in response a 5V pulse signal. Accordingly, the different haptic control signals (e.g., 'Signal A' or 'Signal B' of FIG. 4) may be used to render haptic effects (e.g., push, pull, vibration, etc.) at respective first user input element 411 and second user element 412.

In some configurations, first user input element 411 and second user element 412 may include one or more surface 'smart' materials or gels having a variety of predetermined electrical properties configured to provide additional haptic effects (e.g., stiffening, loosening, textures, thermal, etc.). Example smart materials include piezo, shape memory alloys, electroactive polymers, and the like. In yet some other configurations, first user input element 411 and second user input element 412 may be separated from haptic output device 421 by one or more intermediate layers (e.g., a substrate or gel) that causes first user input element 411 and second user input element 412 to vibrate in a different manner (e.g., frequency, amplitude) in response to the different haptic control signals. Here, the intermediate layers also may act as a variable dampening element.

Figure 5:
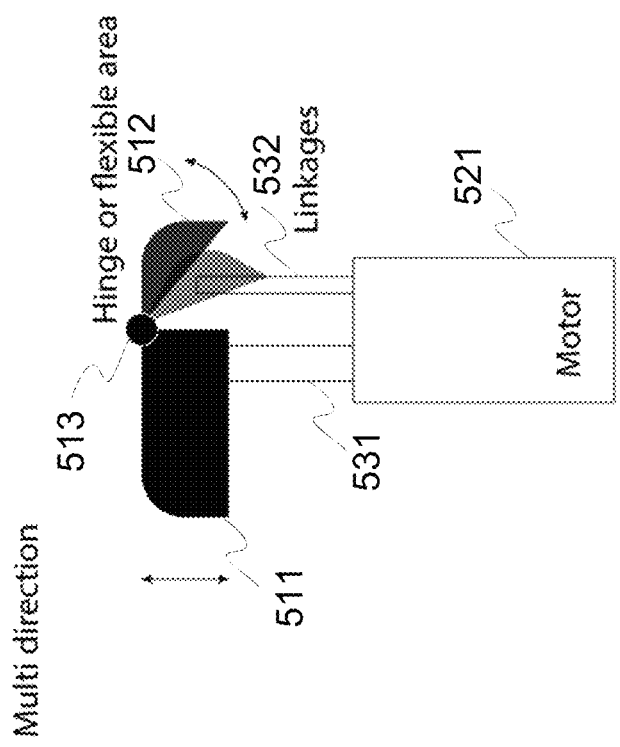
FIG. 5 illustrates a multi-directional trigger structure according to an example embodiment of the present invention.

FIG. 5 illustrates a multi-directional trigger structure 500 according to an example embodiment of the present invention. As shown in FIG. 5, multi-directional trigger structure 500 may include a variety of components such as a first-directional section 511, second-directional section 512, actuator 521, and linkages 531, 532. In this embodiment, actuator 521 may independently and/or simultaneously render one or more haptic effects at first-directional section 511 or second-directional section 512.

In some instances, an optional hinge 513 may physically join or couple first-directional section 511 and second-directional section 512. By using hinge 513, linkage 531 may be used to render haptic effects (e.g., push, pull, vibration, etc.) to both first-directional section 511 and second-directional section 512. However, linkage 532 may be used to render haptic effects to only second-directional section 512. Alternatively, or additionally, first-directional section 511 and second-directional section 512 may be comprised of a flexible trigger. The use of multiple linkages 531, 532 enable different trigger sections, such as first-directional section 511 and second-directional section 512, to share haptic output device 521.

The use of multiple linkages 531, 532 also enable a wider range of haptic effects to be rendered to the user. By using a bifurcated (or trifurcated, etc.) trigger, haptic output device 521 may provide a variety of trigger contours or shapes. In other words, the resulting trigger's shape is configurable. In some embodiments, deformable trigger shapes may be used in connection with contextual interactions. For example, contextual interactions may include the holding of an object in virtual reality. Segments of a trigger (or other user input element) may be configured to accurately represent the surface geometry of a virtual reality object. In another example, if in virtual reality, a user's finger is visualized touching a flat virtual surface, the traditional ergonomic trigger shape may remove or reduce the scalloping to render a flat surface. In other words, depending on the context of the event, the trigger can be a different shape due using bifurcated parts. For example, the bifurcated parts can be in line and move together when the trigger is used as the gas pedal for a vehicle. When acting as a trigger, the bifurcated parts can make an "L" shape to represent the trigger of a gun. In addition, the haptic effects may be applied to triggers having a variety of shapes and sizes. Additional end-stop haptic capability is also provided. End-stop haptic capability generally refers to the grounding of the trigger (or button or other user input element) against an end stop. At the end-stop, the user's finger-tip will not be overcome by the amount of force that the trigger can push back with. However, if the haptic effect is rendered immediately below the user's knuckle, the user is able to feel the haptic effect even when pulling the trigger very hard.

Linkages 531, 532 also may be configured to provide push and pull haptic feedback. By rendering push and pull haptic feedback, one or more spatialization haptic effects may be enhanced. Alternatively, or additionally, first-directional section 511 and second-directional section 512 may be configured to move along multiple axes.

In some embodiments, the shape of trigger structure 500 may be deformable or semi-deformable. For example, trigger structure 500 may include a switch component (not shown) that may be "toggled" into different positions. This would enable the user to control the shape of the trigger structure 500, especially if the trigger structure 500 is composed of a rubberized material. The toggle functionality is particularly useful for devices with a single trigger that may be used in either left or right hands. In addition, the switch component also may be reconfigured in response to each use (e.g., unique trigger shapes for firing individual weapons).

Figure 6:
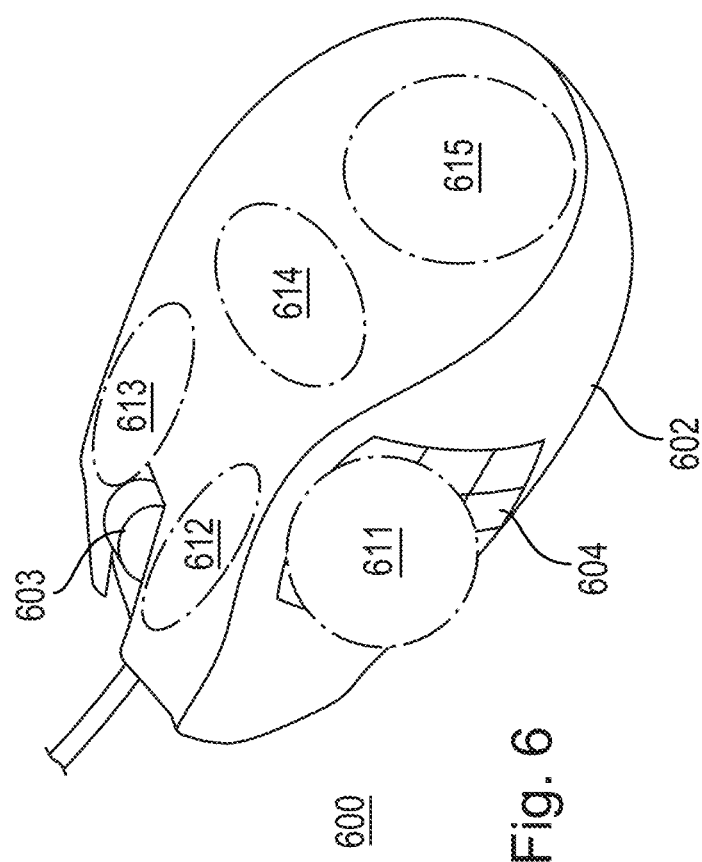
FIG. 6 illustrates a haptic mouse according to an example embodiment of the present invention.

FIG. 6 illustrates a haptic mouse 600 according to another example embodiment of the present invention. In addition to housing 602 and rotary wheel 603, haptic mouse 600 includes a plurality of haptic regions 611, 612, 613, 614, and 615. Each of haptic regions 611-615 may be individually configured to provide one or more haptic effects (e.g., push, pull, vibration, texture, temperature variation, rumble, and the like). In addition, the haptic regions may be configured to correspond to other portions of haptic mouse 600, such as rotary wheel 603 and/or keypad 604. Subsets of haptic regions 611-615 may render haptic effects using a single haptic output device, as described above.

In addition, any of the user input elements described herein may be configured to provide isolated haptic effects (e.g., vibration and/or deformations applied that are isolated from the device housing). In some embodiments, the user input elements may be indirectly coupled to the housing by one or more suspension flexures (e.g., springs). When a haptic effect is applied to the user input elements, the suspension flexures substantially dampen the haptic effects such that they are not applied to the housing. Additionally, or alternatively, a rubber ring or gasket (not shown) may surround the user input elements to dampen the haptic effects.

FIG. 7 illustrates a flow diagram of functionality 700 for rendering haptic effects according to an example embodiment of the present invention. In some instances, the functionality of the flow diagram of FIG. 7 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software functionally implemented by system 10 of FIG. 1.

At the outset, functionality 700 may optionally initialize the haptic device, such as controller 13 of FIG. 1, at 710. For example, functionality 700 may determine or otherwise initialize the respective configurations of the various components of the clutch system and/or actuator. In another example, the state of the user input elements may be configured according to one or more user or designer preferences.

Next, at 720, a haptic control signal is received at the clutch system and/or actuator. In response to receiving the haptic control signal, functionality 700 evaluates the haptic control signal to identify one of a plurality of user input elements configured to be connected to the same actuator for rendering the haptic effect stored within the first haptic control signal, at 730. In response to receiving the haptic control signal, functionality 700 also may reconfigure the components of the clutch system and/or actuator. For example, the actuator may be reconfigured according to an actuator type. The actuator is coupled or otherwise connected to the user input element at 740. In turn, the haptic effect is rendered at the identified haptic output device at 750.

In some embodiments, functionality 700 may evaluate spatial data (e.g., whether device is in user's left or right hand). One or more sensors (e.g., such as sensor 28 of FIG. 1) may be used to determine the controller's orientation to the user or the orientation to other devices. Accordingly, the haptic effects may be modified based on spatial data (e.g., based on determination of finger contact). For example, a haptic effect designed for the first user input element may be rendered at the second input element if the user has no physical contact with the first user input element.

By implementing the various embodiments described herein, enhanced haptic effects may be more efficiently provided by adopting the various embodiments of the present invention. The systems and methods described herein provide multiple haptic effects at different locations of the same device/system using a single actuator. In the various embodiments, the haptic effects are independently or simultaneously rendered at different locations of the device. By reducing the number of haptic output devices needed to drive multiple user input elements, power is saved and cost is reduced.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A haptically enabled device configured to render one or more haptic effects, the haptically enabled device comprising:
    an actuator;
    a first user input element that is configured to be selectively coupled to the actuator, and
    a second user input element that is configured to be selectively coupled to the actuator,
    wherein the actuator is configured to be coupled to the first user input element by moving a moveable shaft in a first lateral direction and configured to be coupled to the second user input element by moving the movable shaft in a second lateral direction.

2. The haptically enabled device according to claim 1, wherein the actuator includes the moveable shaft that is configured to traverse first and second lateral directions.

3. The haptically enabled device according to claim 1, wherein the actuator includes the moveable shaft that is configured to rotate a drive gear of the actuator.

4. The haptically enabled device according to claim 1, wherein the actuator includes a moveable shaft that is positioned according to an input voltage.

5. The haptically enabled device according to claim 1, wherein the actuator includes a moveable shaft that is positioned according to an input signal type.

6. The haptically enabled device according to claim 1, wherein the actuator simultaneously renders haptic effects at a subset of user input elements.

7. The haptically enabled device according to claim 1, wherein the actuator is a bidirectional actuator.

8. A haptically enabled system configured to render one or more haptic effects, the haptically enabled system comprising:
    a processor;
    an actuator; and
    a memory storing one or more programs for execution by the processor, the one or more programs including instructions for:
    selectively coupling the actuator to a first user input element, and
    selectively coupling the actuator to a second user input element,
    wherein the actuator is configured to be coupled to the first user input element by moving a moveable shaft in a first lateral direction and configured to be coupled to the second user input element by moving the movable shaft in a second lateral direction.

9. The haptically enabled system according to claim 8, wherein the actuator includes the moveable shaft that is configured to traverse first and second lateral directions.

10. The haptically enabled system according to claim 8, wherein the actuator includes the moveable shaft that is configured to rotate a drive gear of the actuator.

11. The haptically enabled system according to claim 8, wherein the actuator includes a moveable shaft that is positioned according to an input voltage.

12. The haptically enabled system according to claim 8, wherein the actuator includes a moveable shaft that is positioned according to an input signal type.

13. The haptically enabled system according to claim 8, wherein the actuator simultaneously renders haptic effects at a subset of user input elements.

14. The haptically enabled system according to claim 8, wherein the actuator is a bidirectional actuator.

15. A non-transitory computer readable storage medium storing one or more programs configured to be executed by a processor, the one or more programs comprising instructions for:
   selectively coupling an actuator to a first user input element; and
   selectively coupling the actuator to a second user input element;
   wherein the actuator is configured to be coupled to the first user input element by moving a moveable shaft in a first lateral direction and configured to be coupled to the second user input element by moving the movable shaft in a second lateral direction.

16. The non-transitory computer readable storage medium of claim 15, wherein the actuator includes the moveable shaft that is configured to traverse first and second lateral directions.

17. The non-transitory computer readable storage medium of claim 15, wherein the actuator includes the moveable shaft that is configured to rotate a drive gear of the actuator.

18. The non-transitory computer readable storage medium of claim 15, wherein the actuator includes a moveable shaft that is positioned according to an input voltage.

19. The non-transitory computer readable storage medium of claim 15, wherein the actuator includes a moveable shaft that is positioned according to an input signal type.

20. The non-transitory computer readable storage medium of claim 15, wherein the actuator simultaneously renders haptic effects at a subset of user input elements.

* * * * *